May 29, 1956     A. F. MILLINGTON     2,747,255

UNIVERSAL SLOTTING MACHINE

Filed Oct. 6, 1952     3 Sheets-Sheet 1

INVENTOR.
ALFRED F. MILLINGTON
BY Whittemore,
Hulbert & Belknap
ATTORNEYS

May 29, 1956

A. F. MILLINGTON 2,747,255

UNIVERSAL SLOTTING MACHINE

Filed Oct. 6, 1952

INVENTOR.
ALFRED F. MILLINGTON
BY Whittemore,
Hulbert & Belknap
ATTORNEYS

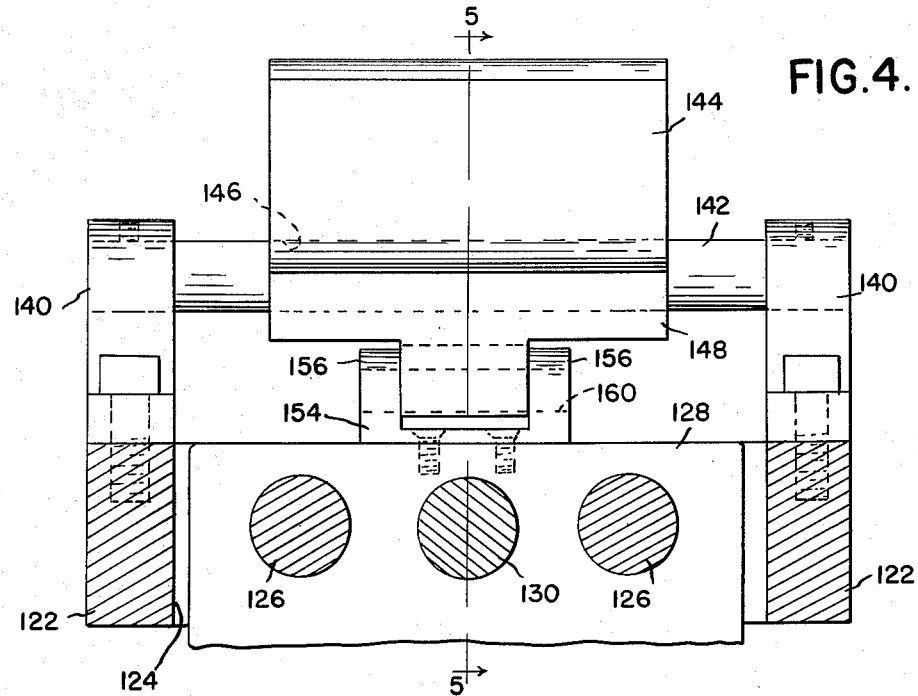
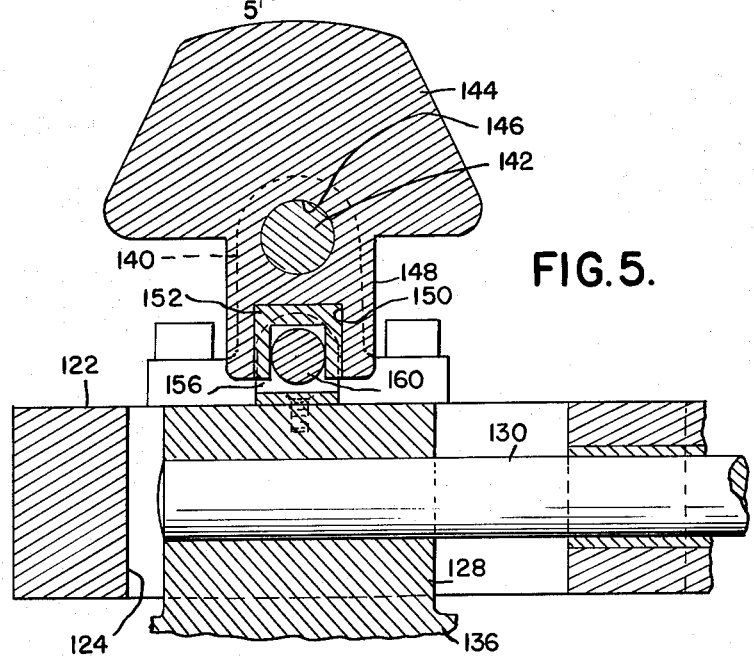

United States Patent Office 2,747,255
    Patented May 29, 1956

2,747,255

UNIVERSAL SLOTTING MACHINE

Alfred F. Millington, Northville, Mich., assignor to Novi Equipment Company, Novi, Mich., a corporation of Michigan Application October 6, 1952, Serial No. 313,281

9 Claims. (Cl. 29—73)

The present invention relates to a universal slotting machine. The machine is designed primarily for use in cutting slots in cracked blocks such for example as engine blocks, and more particularly, cracks extending from a cylinder thereof to an adjacent lateral surface such for example as an adjacent passage in the block, or a lateral side of the block.

While the machine is designed primarily for this purpose it has features of novelty which are useful in other relationships and accordingly, the invention is not to be limited to the particular use set forth.

It is an object of the present invention to provide a universal slotting machine characterized by the adjustability of the cutting head thereof in which the head may be adjusted rectilinearly in any direction and may be adjusted angularly about an axis which extends in any direction.

It is a further object of the present invention to provide a universal slotting machine including a reciprocating cutting tool such for example as a saw, in combination with dynamic balancing means effective to minimize vibration of the machine resulting from rapid reciprocation of the cutting tool.

It is a further object of the present invention to provide a universal slotting machine adapted to support a work piece such for example as an engine block, on an adjustable support in combination with two independent cutting mechanisms which may be brought selectively to operative position by adjustment of the support.

It is a further object of the present invention to provide a universal slotting machine characterized by its adaptability to form a slot in a work piece at substantially any angle with respect thereto.

Other objects and features of the invention will become apparent as the description proceeds, especially when taken in conjunction with the accompanying drawings, wherein:

Figure 4 is an enlarged view of the cutting head of a dynamic counterbalance mechanism associated therewith.

Figure 5 is a section on the line 5—5, Figure 4.

Figure 1:
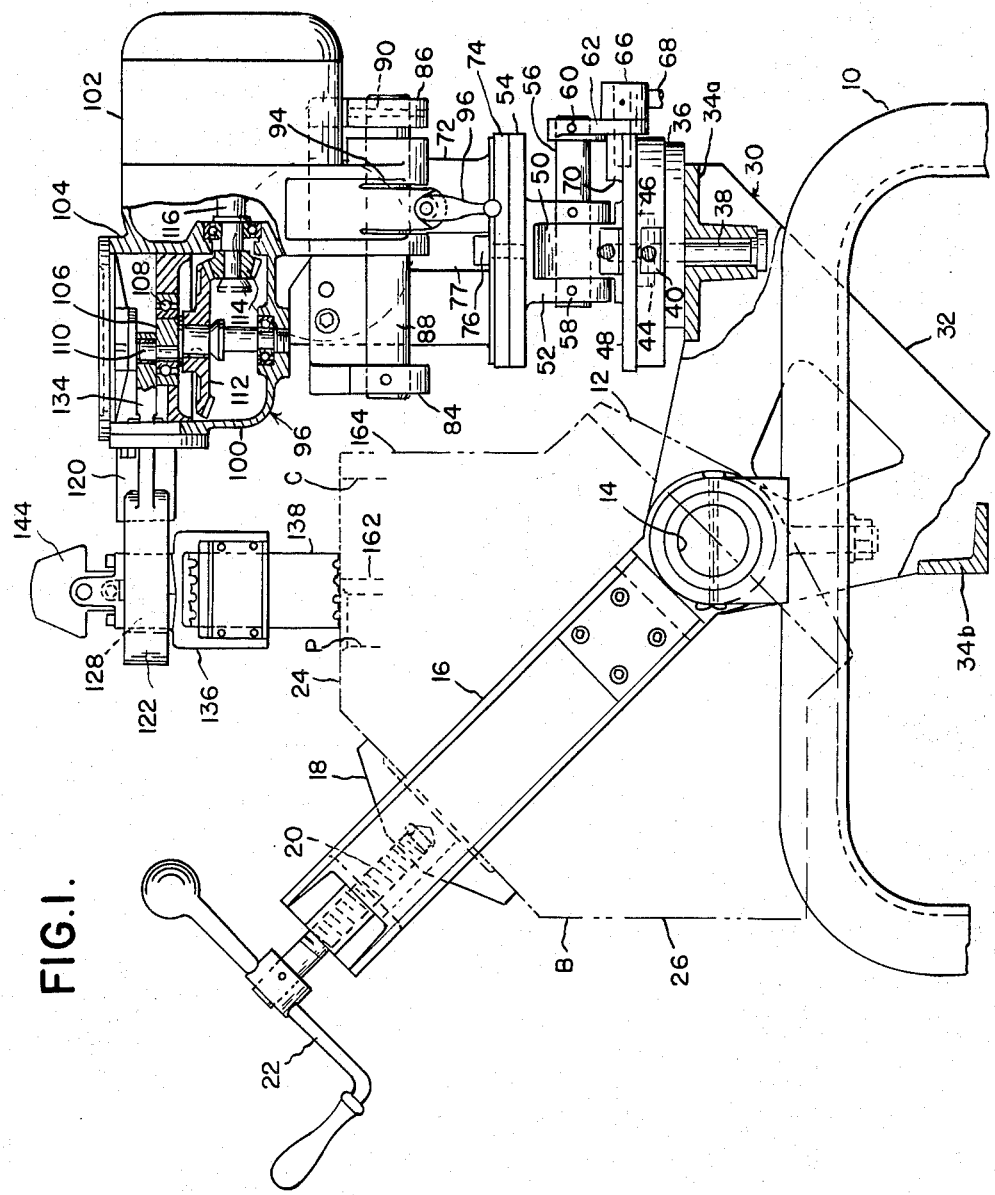
Figure 1 is a side elevation of the improved slotting machine with parts broken away and parts omitted.

The slotting machine comprises a stationary base 10 having journalled thereon a work supporting bed 12 mounted for angular adjustment about a tubular shaft 14. Associated with the bed is a clamping bracket 16 including a clamp 18 adapted to be moved toward and away from the bed 12 by a clamping screw 20 having an operating handle 22 secured thereto.

The machine is designed primarily for a specific use in conjunction with a V-type engine block illustrated at B, this block having banks of cylinders one of which is indicated at C and associated passages P along one surface 24 of the block. It will be understood that similar banks of cylinders and passages are provided along the face 26 of the block.

Associated with the angularly adjustable bed 12 is work supporting structure indicated generally at 30 which comprises brackets 32 mounted for angular adjustment about the axis of the shaft 14 in conjunction with the bed 12. Carried by the brackets 32 are rails 34a and 34b. By referring to Figure 1 it will be observed that the rails 34a and 34b are provided at opposite sides of the bracket 32. In use, it is contemplated that cutting mechanism will be permanently mounted on each of the rails 34a and 34b. The cutting mechanism mounted on the rail 34b, a portion of which is seen at the extreme bottom of Figure 1, is not illustrated since this cutting mechanism is identical in all respects with the cutting mechanism mounted on the upper rail 34a.

The foregoing described arrangement permits the engine block to be mounted on the bed 12 and clamped in place with the parts in the relationship illustrated. At this time the cutting mechanism is operated to produce desired cuts extending to the upper surface 24 of the block B. After the desired cuts or slots have been made in the upper surface 24 of the block, the bed 12 and cutter supporting mechanism 30 will be angularly adjusted through an angle of 90 degrees, thereby bringing the face 26 of the block to upper horizontal position and bring the cutting mechanism carried by the rail 34b to upper position.

Figures 2, 3:
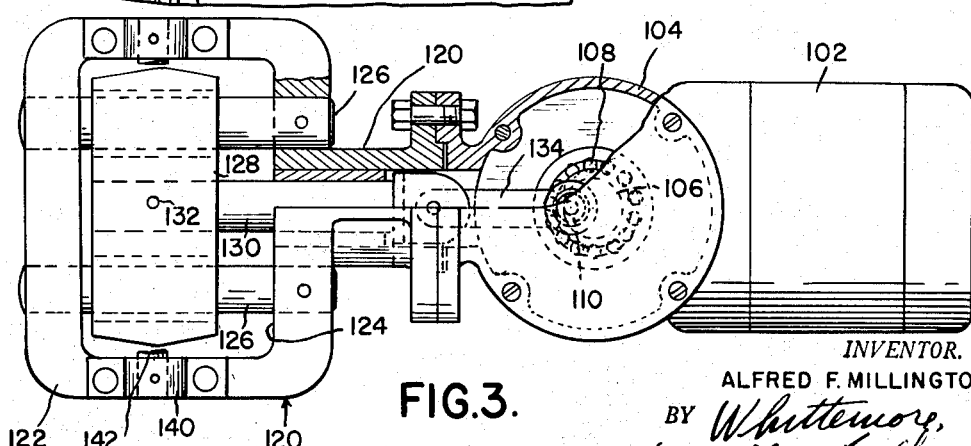
Figure 2 is an enlarged fragmentary front elevation of the machine illustrated in Figure 1 with parts omitted.
Figure 3 is a plan view of the cutting head of the machine with parts broken away.

The cutting mechanism comprises a slide 36 slidable along the rail 34a and adapted to be clamped in adjusted position thereon by bolts 38 having associated therewith clamping nuts 40 provided with the handles 42 seen in Figure 2. The slide 36, as best seen in Figure 1, has a recess 44 which receives a pilot portion 46 of a plate 48 which is thereby mounted for angular adjustment about a vertical axis with respect to the slide 46. The plate 48 includes an upwardly extending portion 50 which is received between downwardly extending ears 52 of a second plate 54. A shaft 56 extends through registering openings in the ears and is pinned in place therein by pins 58. The shaft 56 is rotatable in an opening in the upper projection 50 provided on the plate 48, thus providing for angular adjustment of the plate 54 with respect to the plate 48 about the horizontal axis of the shaft 56. In order to effect controlled angular adjustment of the plate 54, the shaft 56 has pinned or otherwise secured thereto as indicated at 60, a sector plate 62 having an arcuate slot 64 therein through which extends a clamping screw 66 having an operating handle 68, the screw extending into a threaded recess in an enlargement 70 provided on the plate 48.

Carried by the plate 54 is a column 72 having a lowermost circular plate 74 secured to the plate 54 as by a central pilot (not shown) and adapted to be locked in angularly adjusted position thereto by bolts 76 associated in T-slots of the plate 54 or the like. It will be understood that the adjustment of the column 72 relative to the plate 54 is therefore about an upwardly extending axis perpendicular to and intersecting the axis of the shaft 56.

The left hand face of the column 72 as seen in Figure 2, is provided with vertically extending ways 77 in which is movably carried a slide 78. Vertical adjustment of the slide 78 in the ways 77 is provided by a feed screw (not shown) associated with suitable nut means carried by the slide 78 and actuated by a handle 80.

Extending forwardly from the slide 78 are a pair of arms 82 terminating in bearing portions 84 and 86 which carry a supporting shaft 88 pinned or otherwise secured to one or both of the bearing portions 84 and 86 as indicated at 90.

Mounted for adjustment longitudinally of the shaft 88 and for angular adjustment about the axis of this shaft is a cutter device indicated generally at 92. The cutter device includes a split clamping sleeve 94 having associated therewith a clamping screw device indicated generally at 96 whereby the entire cutter device 92 may be loosened and adjusted longitudinally and angularly with respect to the shaft 88.

The cutter device comprises essentially a housing structure 100 including a motor housing 102 and a drive housing portion 104. Within the drive housing portion is a crank 106 journalled in suitable bearings 108 and including a crank pin 110. Rigidly connected to the crank is a beveled gear 112 operatively connected to a second beveled gear 114 adapted to be driven by the shaft 116 of the motor.

Bolted or otherwise secured to the drive housing 104 is a support bracket 120 details of which are best seen in Figure 3. The bracket 120 includes a yoke 122 having an opening 124 therein spanned by guide rails 126. Mounted on the guide rails is a block 128 having a rod 130 pinned or otherwise connected thereto as indicated at 132, the rod 130 being connected by a link 134 to the crank pin 110. Obviously therefore, rotation of the crank 106 effects reciprocation of the block 128 on the guide rails 126.

As best seen in Figure 1, the block 128 includes a downward extension 136 which is adapted to releasably carry a slotting tool 138, this tool being illustrated herein as a relatively short saw provided with cutting teeth at opposite edges thereof whereby the saw may be reversed after the teeth at one edge thereof become dull.

In order to employ the saw blade 138 efficiently, and due to the relative shortness of the blade required by its intended use, it is preferred to reciprocate the block 128 at a relatively high speed. Unless means are provided to counterbalance the weight of the block 128, undesirable vibrations are set up. Accordingly, a dynamic counterbalance mechanism, best illustrated in Figures 4 and 5, is provided. Mounted on the lateral arms of the yoke 122 are brackets 140 in which is fixedly secured a rock shaft 142. A dynamic counterbalance weight 144 is provided. Extending longitudinally through the counterbalance 144 is an opening 146 adapted to receive the shaft 142 whereby to mount the counterbalance for rocking movement about the axis of the shaft. The counterbalance 144 includes a downwardly extending portion 148 having a downwardly facing opening 150 therein which receives a bushing 152 in the form of a rectangular trough, the bushing preferably being formed of a hard material.

Mounted on the upper surface of the block 128 is a bracket 154 having upstanding ears 156 between which extends a pin 160. As best seen in Figure 5, the pin is received within the bushing 152 so that as the block 128 is reciprocated to the right and left as seen in Figure 5, oscillation is imparted to the dynamic counterbalance 144. Obviously, motion of the block 128 to the right as seen in this figure, results in movement of the greater mass of the counterbalance mechanism to the left thereby establishing an approximate dynamic counterbalance. It is found that with the dynamic counterbalance provided, very rapid reciprocation of the saw mechanism may be obtained without introducing undesirable vibration or noise.

Referring now to Figure 1 it will be observed that the saw is in position to cut a slot in a part 162 which extends between a cylinder C and an interior passage P of the block. In practice, it is found that in some cases engine blocks are subject to development of cracks which extend from the surface of the block and between a cylinder C and a lateral surface thereof, such for example as the adjacent surface provided in the passage P, or the outside lateral surface of the block illustrated at 164. The present machine is designed to form slots in coincidence with cracks so as to remove the rough uneven interior surfaces of the crack to permit insertion of a flat plate to seal the cracks. Accordingly, it is essential in a machine of this type to provide for universal adjustment of the cutting mechanism since the cracks may extend in any direction with reference to the motor block. This is accomplished in the present instance and it will be observed that the adjustable features of the support permit rectilinear movement of the cutting head carrying the saw blade 138 in any direction and at the same time will permit angular adjustment of the cutter head about an axis which extends in any direction. There is thus provided complete adjustability which permits the saw blade to be positioned in operative relation to any crack in the block which may require repair.

The drawings and the foregoing specification constitute a description of the improved universal slotting machine in such full, clear, concise and exact terms as to enable any person skilled in the art to practice the invention, the scope of which is indicated by the appended claims.

What I claim as my invention is:

1. A slotting machine comprising a base, means on said base for supporting a work piece, a horizontal rail on said base, a support slide adjustable longitudinally of said rail, a first plate mounted on said slide for angular adjustment about a vertical axis, a second plate swivelled to said first plate for angular adjustment about a horizontal axis, an upwardly extending tool support column swivelled to said second plate for angular adjustment about an axis perpendicular to and intersecting said horizontal axis, a tool slide on said column adjustable longitudinally thereof, a slotting cutter carried by said tool slide, and adjustable means intermediate said slotting cutter and tool slide providing for rectilinear adjustment of said cutter in a plane perpendicular to the direction of adjustment of said tool slide on said column and for angular adjustment about an axis parallel to the direction of its rectilinear adjustment.

2. A machine as defined in claim 1 in which said slotting cutter comprises a sub-assembly including a reciprocating saw, a motor, and means connecting said motor and saw and in which said adjustable means comprises a round shaft fixed to said tool slide, and releasable clamp means on said sub-assembly adjustable circumferentially and longitudinally of said shaft.

3. A slotting machine comprising a base, a work support on said base, a horizontal rail on said base extending along the side of said work support, a slide adjustable longitudinally along said rail, a first plate swivelled to said slide for angular adjustment about a vertical axis, a second plate, means connecting said second plate to said first plate for angular adjustment about a horizontal axis, an elongated upwardly extending column carried by said second plate, means connecting said column to said second plate for angular adjustment about its longitudinal axis perpendicular to and intersecting said horizontal axis, ways on said column extending longitudinally thereof, a second slide on said ways, a power driven slotting cutter carried by said second slide, and support means for said cutter including means providing for angular adjustment of said cutter about an axis perpendicular to and spaced from said ways, and for rectilinear adjustment parallel to said last mentioned axis.

4. A slotting machine comprising a base, a work support on said base, a horizontal rail on said base extending along the side of said work support, a slide adjustable longitudinally along said rail, a first plate swivelled to said slide for angular adjustment about a vertical axis, a second plate, means connecting said second plate to said first plate for angular adjustment about a horizontal axis, an elongated upwardly extending column carried by said second plate, means connecting said column to said second plate for angular adjustment about an axis perpendicular to and intersecting said horizontal axis, ways on said column extending longitudinally thereof, a second slide on said ways, a power driven slotting cutter carried by said second slide, and support means for said cutter comprising a shaft carried by said second slide spaced laterally from and perpendicular to said ways, said cutter including releasable grip means engaging said shaft and rotatable and longitudinally slidable thereon.

5. In a slotting cutter, rectilinear guide means, a saw blade support carried by said guide means for reciprocation thereon, a rock shaft disposed at right angles to the path of reciprocation of said blade support, a counterbalance pivoted intermediate its ends by said shaft, said counterbalance having means coupling the end thereof adjacent to said blade support to said blade support for rocking said counterbalance in accordance with reciprocation of said blade support, the center of gravity of said counterbalance being located laterally outwardly of said shaft from said blade support.

6. Structure as defined in claim 5 in which the means coupling said counterbalance to said blade support comprises a pin and slot connection therebetween.

7. Structure as defined in claim 6 which comprises means for reciprocating said saw support in a short stroke at high frequency.

8. A slotting machine for sawing slots to remove cracks extending inwardly from angularly disposed faces of a V-type engine block having angularly disposed banks of cylinders, said machine comprising a base, a support pivoted to said base for rocking movement about a horizontal axis through an angle equal to the angle between the banks of cylinders, means for clamping an engine block to said support with its said faces at opposite sides of a plane radial of said horizontal axis, said base having rails at opposite sides thereof extending parallel to said horizontal axis, adjustable slotting mechanism carried by each of said rails, whereby either of said faces of the block may be brought to upper operative position with its associated slotting mechanism.

9. Structure as defined in claim 8 in which said adjustable slotting mechanism comprises a cutter and means for effecting rectilinear adjustment of said cutter in any direction and angular adjustment of said cutter about an axis extending in any direction.

References Cited in the file of this patent

UNITED STATES PATENTS

| | | |
|---|---|---|
| 834,958 | Wilkin | Nov. 6, 1906 |
| 2,258,828 | Trebert | Oct. 14, 1941 |
| 2,394,175 | Hill | Feb. 5, 1946 |
| 2,590,093 | Duen | Mar. 25, 1952 |